(12) United States Patent
Yin

(10) Patent No.: US 11,128,879 B2
(45) Date of Patent: Sep. 21, 2021

(54) HYBRID DECODING

(71) Applicant: Shanghai Bilibili Technology Co., Ltd., Shanghai (CN)

(72) Inventor: Wenjie Yin, Shanghai (CN)

(73) Assignee: SHANGHAI BILIBILI TECHNOLOGY CO., LTD., Shanghai (CN)

( * ) Notice: Subject to any disclaimer, the term of this patent is extended or adjusted under 35 U.S.C. 154(b) by 87 days.

(21) Appl. No.: 16/418,733

(22) Filed: May 21, 2019

(65) Prior Publication Data

US 2019/0373274 A1    Dec. 5, 2019

(30) Foreign Application Priority Data

Jun. 5, 2018 (CN) .......................... 201810567282.1

(51) Int. Cl.
| | | |
|---|---|---|
| H04N 19/44 | (2014.01) | |
| H04N 19/172 | (2014.01) | |
| H04N 19/42 | (2014.01) | |
| G06F 9/38 | (2018.01) | |
| H04N 19/426 | (2014.01) | |

(52) U.S. Cl.
CPC ........... *H04N 19/44* (2014.11); *G06F 9/3836* (2013.01); *H04N 19/172* (2014.11); *H04N 19/427* (2014.11)

(58) Field of Classification Search
None
See application file for complete search history.

(56) References Cited

U.S. PATENT DOCUMENTS

| | | | | |
|---|---|---|---|---|
| 2010/0328527 | A1* | 12/2010 | Brandsma | ................ H04N 5/44 348/388.1 |
| 2014/0079327 | A1 | 3/2014 | Diard | |

FOREIGN PATENT DOCUMENTS

| | | |
|---|---|---|
| CN | 106375767 A | 2/2017 |
| CN | 106792066 A | 5/2017 |
| CN | 107172432 A | 9/2017 |
| CN | 107295403 A | 10/2017 |
| CN | 107707976 A | 2/2018 |
| CN | 107786890 A | 3/2018 |

OTHER PUBLICATIONS

Felix Paul Kühne and Carola Nitz, "Video Toolbox and Hardware Acceleration" OBJC, Issue 23, Apr. 2015 ("Kune") which can be found on https://www.objc.io/issues/23-video/videotoolbox/ (Year: 2015).*

* cited by examiner

*Primary Examiner* — Mikhail Itskovich
(74) *Attorney, Agent, or Firm* — BakerHostetler

(57) ABSTRACT

Techniques for quickly displaying a first frame of a video using hybrid decoding are described herein. The disclosed techniques include starting a software decoding thread by a video player; initializing a software decoder by the software decoding thread; decoding and rendering images during a start period by the software decoder while starting a hardware decoding thread by the software decoding thread; initializing a hardware decoder by the hardware decoding thread; and decoding but not rendering the images during the start period by the hardware decoder. In this way, a first frame of a video can be displayed quickly, a waiting time can be reduced, and user experience can be improved.

9 Claims, 5 Drawing Sheets

HYBRID DECODING

CROSS-REFERENCE TO RELATED APPLICATION

The present application claims priority of Chinese patent application No. 201810567282.1, filed on Jun. 5, 2018. The entire disclosure of the above-identified application is hereby incorporated by reference herein and made a part of this specification.

BACKGROUND

Nowadays, mobile players normally provide two video decoding methods, software decoding and hardware decoding. Generally, because the hardware decoding occupies less system resources, and has higher computing performance, the players on user terminals prefer the hardware decoding. However, a longer initialization period is a problem of the hardware decoding, the threads are shown in FIG. 1, which has negative impact on the time of decoding, rendering and displaying images on screen. The users have to wait a period of time obviously, and it cause poor user experience.

If a video software decoding is adopted, the thread is shown in FIG. 2. The speed of setting up a decoder and initializing is relatively fast, but the overall decoding performance is poor, and the power consumption is too high, which may cause serious problems such as cell phone heating and quick power loss. And the software decoding is not applicable to most old mobile devices.

DETAILED DESCRIPTION OF ILLUSTRATIVE EMBODIMENTS

One object of the present invention is to provide a video playing method, device and computer-readable storage medium that can quickly decode and start playing videos to improve user experience and save resource occupation. The present disclosure provides techniques of quickly displaying a first frame of a video by using hybrid decoding. During a start period, a software decoder decodes and renders images while starting and initializing a hardware decoder; and the hardware decoder decodes but does not render the images. When both the software and hardware decoders complete decoding the images during the start period, the software decoding thread ends, the hardware decoder continues to decode and render subsequent images after the start period. In this way, the first frame can be displayed quickly, the waiting time can be reduced, and the user experience can be improved. Furthermore, the hardware decoder can be used to save resources. The invention also has the advantages of low cost, simple realization method and wide application range.

Figure 3:
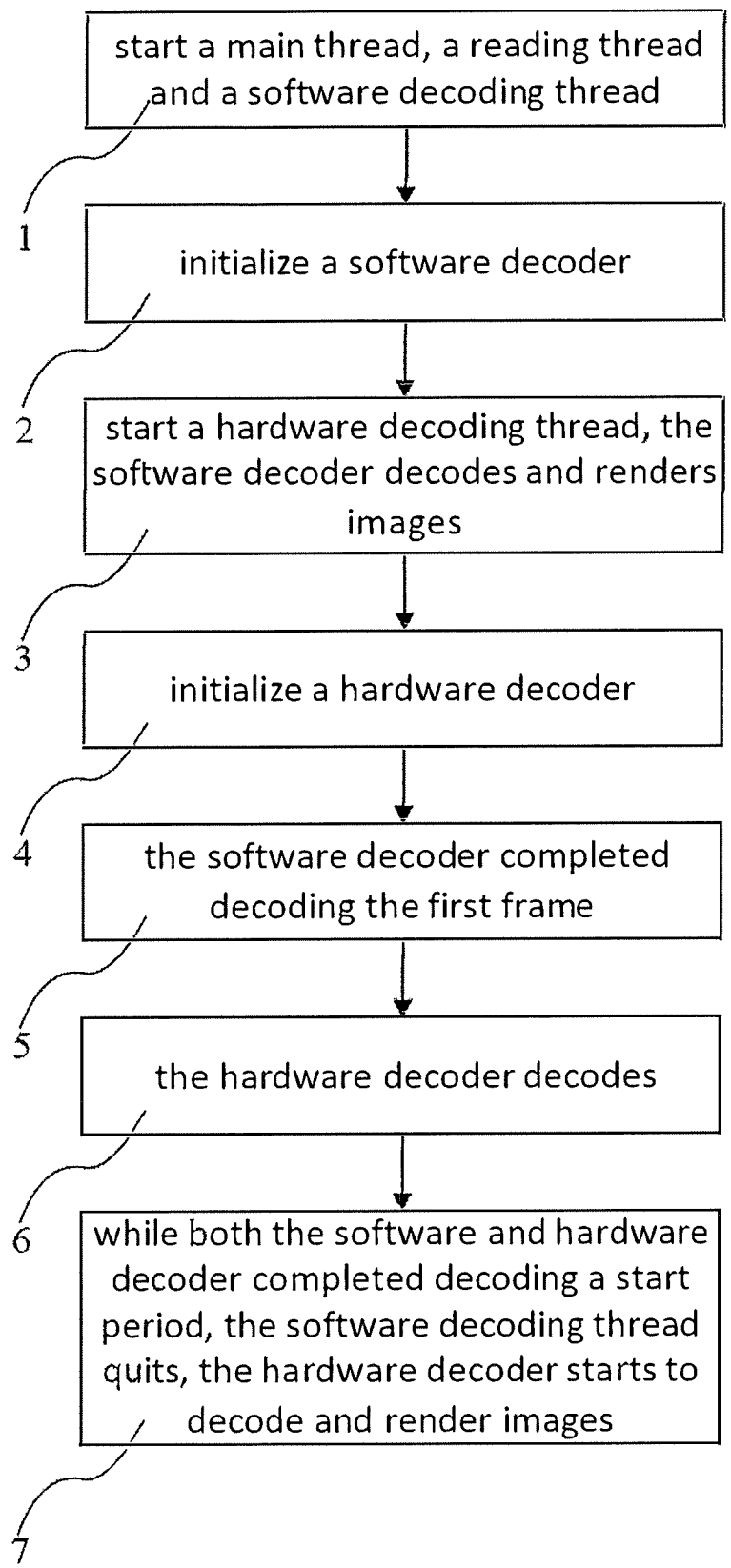
FIG. 3 is a flowchart illustrating an example process of quick displaying a first frame by using hybrid decoding in accordance with the present disclosure.

In order to better understand the technical content of the present disclosure, the following embodiments are described in detail. FIG. 3 is a flowchart illustrating an example process of fast displaying a first frame by using mixed decoding.

In one embodiment, the video playing method of quick displaying a first frame by mixed decoding includes following steps, (1) a video player starts a main thread of video playing, the main thread starts a reading thread, the reading thread starts a software decoding thread;

(2) the software decoding thread initializes a software decoder;

(3) the software decoding thread starts a hardware decoding thread, the software decoder decodes receives video data package and renders images;

(4) the hardware decoding thread initializes a hardware decoder;

(5) the software decoder completed decoding the first frame image;

(6) the hardware decoder decodes received video data package;

(7) while both the software decoder and the hardware decoder completed decoding a start period, the software decoding thread quits, the hardware decoder starts to decode received video data package and render images.

In a preferred embodiment, the step (7) includes following steps,

(71) the hardware decoder is paused after completed decoding the start period;

(72) after the software decoder completed decoding and rendering the start period, the software decoding thread quits;

(73) the hardware decoder starts to decode and render subsequent images according to the received video data package.

In a further preferred embodiment, the start period is the first group of pictures.

In an embodiment based on iOS system, the video playing method of quick displaying first frame by mixed decoding includes following steps, (1) an iOS video player starts a main thread of video playing, the main thread starts a reading thread, the reading thread starts a software decoding thread;

(2) the software decoding thread initializes an avcodec software decoder;

(3) the software decoding thread starts a hardware decoding thread, the avcodec software decoder decodes receives video data package and renders images;

(4) the hardware decoding thread initializes a VideoToolbox hardware decoder;

(5) the avcodec software decoder completed decoding the first frame image;

(6) the VideoToolbox hardware decoder decodes received video data package;

(7) while both the avcodec software decoder and the VideoToolbox hardware decoder completed decoding a start period, the software decoding thread quits, the VideoToolbox hardware decoder starts to decode received video data package and render images.

In a preferred embodiment, the step (4) includes following steps,

(41) the hardware decoding thread creates a format description of 'VideoFormatDescription';

(42) the hardware decoding thread creates a session of 'VTDecompressionSession';

(43) the hardware decoding thread initializes a VideoToolbox hardware decoder.

The step (7) includes following steps,

(71) the VideoToolbox hardware decoder is paused after completed decoding the start period;

(72) after the avcodec software decoder completed decoding and rendering the start period, the software decoding thread quits;

(73) the VideoToolbox hardware decoder starts to decode and render subsequent images according to the received video data package.

Wherein, the start period is the first group of pictures.

The present invention also provides a video playing device of quick displaying first frame by mixed decoding. The device includes a processor and a storage, the storage is a computer-readable storage medium on which a computer program is stored. The video playing method of quick displaying first frame by mixed decoding according to any one of embodiments mentioned above is carried out when the computer program is executed by the processor.

In the practical application, the specific realization of the video playing method and device of quick displaying first frame by mixed decoding of this invention is illustrated by the following embodiments.

Embodiment 1

Figure 4:
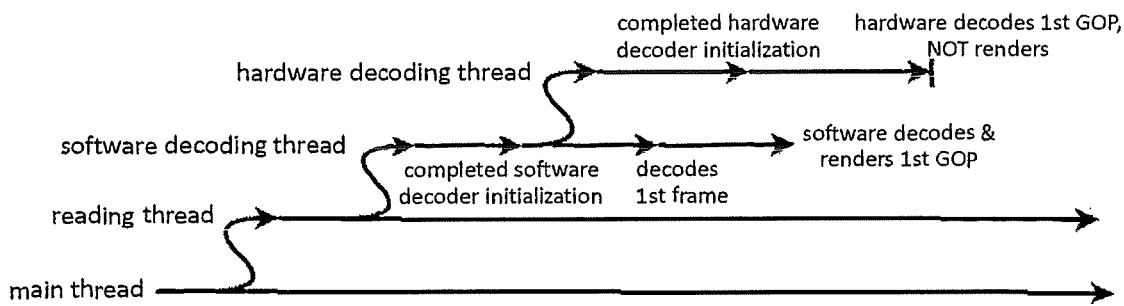
FIG. 4 is a thread diagram illustrating an example process of decoding a first group of images (GOP) in accordance with the present disclosure.
Figure 5:
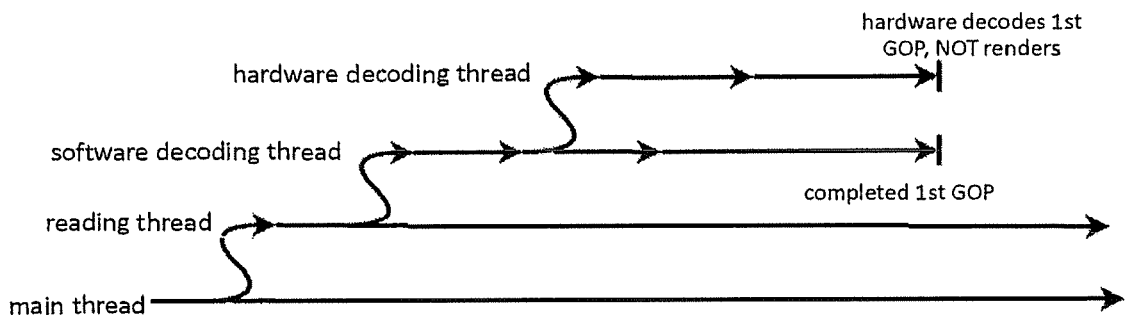
FIG. 5 is a thread diagram illustrating both software decoder and hardware decoder completing decoding the first GOP in accordance with the present disclosure.
Figure 6:
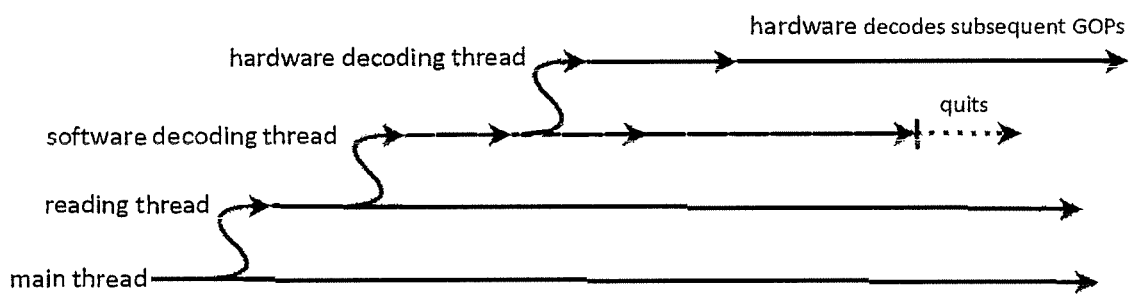
FIG. 6 is a thread diagram illustrating decoding subsequent GOPs using hardware decoder in accordance with the present disclosure.

The mobile terminal is set as hardware decoding, and the optimization is enabled. The mixed decoding and playing method is adopted for the optimization. In this method, a hardware decoding thread is started by a software decoding thread, and relevant data is passed in to construct a hardware decoder. Meanwhile, the software decoding thread does not quit; instead, as shown in FIG. 4, undertakes decoding and rendering images tasks within a GOP (Group of Pictures/Images, a group of continuous pictures/images). At the same time, a copy of the read video package is sent to the hardware decoding thread which only decoding without rendering. Therefore, the hardware decoding thread runs much faster than the software decoding thread. When the hardware decoding thread decoded the GOP, pause the operation, as shown in FIG. 5, and waits for the images decoded by the software to be played to the same location. Then, as shown in FIG. 6, the software decoding thread quits, and the hardware decoding thread continues to decode and render subsequent images for displaying.

Taking the iOS player as an example, the following steps are required to create a VideoToolbox hardware decoder on the iOS terminal, 1. Create a software decoder, such as avcodec;
2. Create VideoFormatDescription, this step normally requires information about the software decoder;
3. Create VTDecompressionSession, can decode after successful creation.

In the actual operation, there are two situations as follows:
1. After the software decoder is created, it is actually enabled to decode;
2. Steps 2 and 3 usually take longer time.

Thus, if the creation of avcodec can be performed by the software decoding thread, steps 2 and 3 are performed by the hardware decoding thread started by the software decoding thread, as described above, during the period of steps 2 and 3, the avcodec decodes and renders video. After the avcodec has finished decoding and rendering a GOP, the VideoToolbox decoder has also finished decoding and waiting for the subsequent video data, at this moment, the avcodec software decoding thread can quit, the VideoToolbox decoder continues to perform decoding and rendering work.

Figure 7:
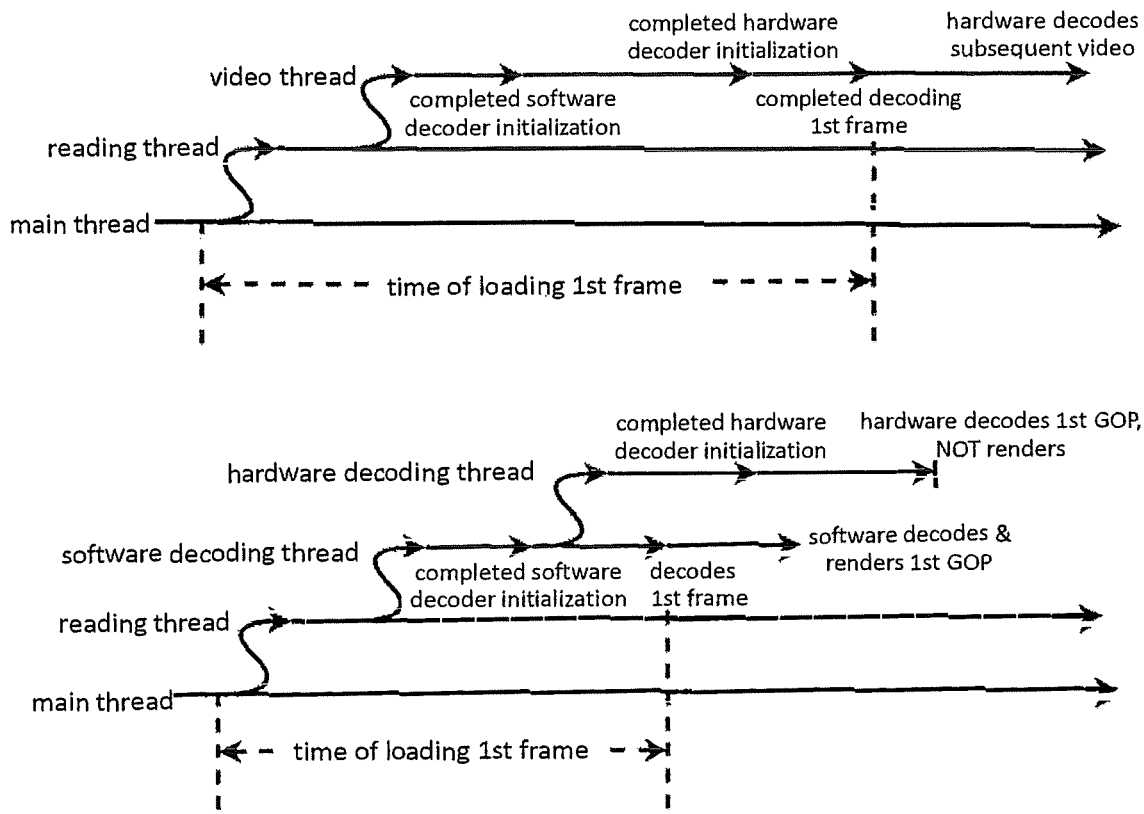
FIG. 7 illustrates a comparison between a time of loading a first frame using traditional hardware decoding and a time of loading a first frame using hybrid decoding in accordance with the present disclosure.

As shown in FIG. 7, it is a comparison chart of the first frame loading time between using traditional hardware decoding method (above) and using this present disclosure (below). Obviously, the method of this disclosure can effectively shorten the loading time of the first frame image and improve the user experience on the premise of ensuring the high performance and low power consumption of the mobile device by using hardware decoding.

The method of the invention can be realized in the players based on Android system in a similar way to the iOS player mentioned above.

Of course, the mobile players adopting this invention may also be selected to use a traditional hardware or software decoding mode.

Figure 8:
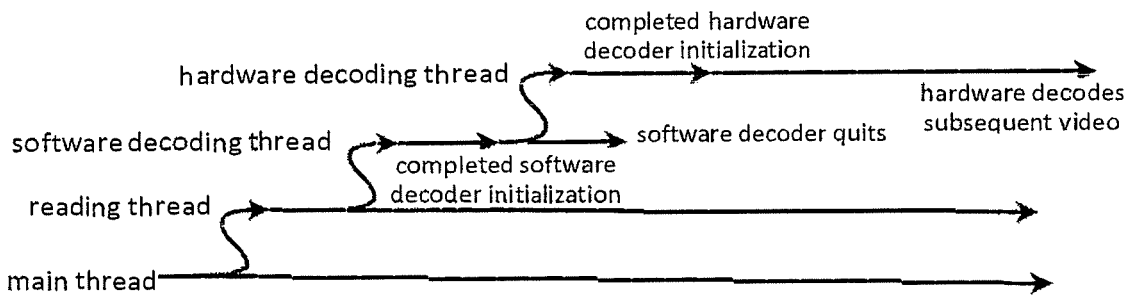
FIG. 8 is a thread diagram illustrating an unoptimized hybrid decoding process.

If a hardware decoding is adopted, a hardware decoding thread is started by the software decoding thread, and relevant data is passed in to construct a hardware decoder. After that, the software decoding thread quits, and the hardware decoding thread decodes videos. This process is shown in FIG. 8.

Figure 1:
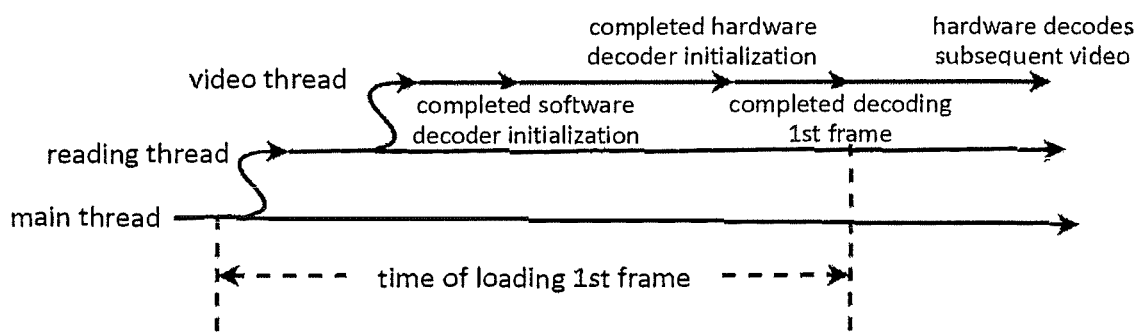
FIG. 1 is a thread diagram of hardware decoding in the mobile players in the prior art.
Figure 2:
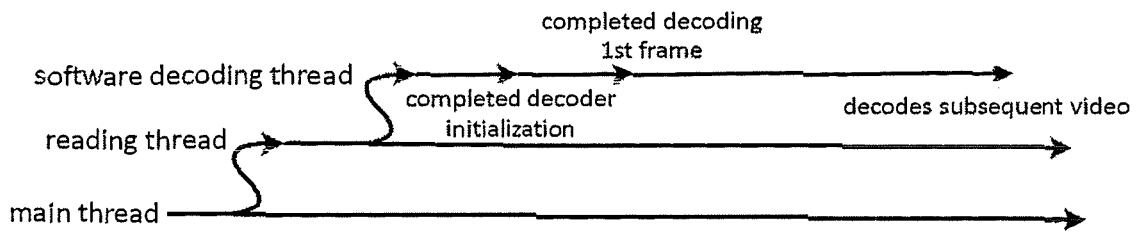
FIG. 2 is a thread diagram of software decoding in the mobile players in the prior art.

If a software decoding is adopted, the process is same as the background technology. As shown in FIG. 2, the decoding is realized in the software decoding thread directly.

By analyzing the steps of mobile player decoding video stream, this invention designs a video decoding method with mixed software and hardware decoding, which not only improves the loading speed of video, but also ensures the performance and low power consumption of the whole decoding process, therefore, the advantages of both hardware and software decoding are considered.

By implementing this invention, a video playing method, device and computer-readable storage medium of quick displaying first frame by mixed decoding, at the same time of the software decoder decoding and rendering images, and quickly completed the first frame, the hardware decoder decodes the images. When both the software and hardware decoders are completed decoding images of the start period, the software decoding thread quits, the hardware decoder continues to decode and render images. In this way, the first frame can be displayed quickly, the waiting time can be reduced, and the user experience can be improved, furthermore, the hardware decoder can be used to save resources. The invention also has the advantages of low cost, simple realization method and wide application range.

Those skilled in the art will also appreciate that the subject matter described herein may be practiced on or in conjunction with other computer system configurations beyond those described herein, including multiprocessor systems, microprocessor-based or programmable consumer electronics, minicomputers, mainframe computers, handheld computers, personal digital assistants, e-readers, cellular telephone devices, special-purposed hardware devices, network appliances, and the like. The embodiments described herein may also be practiced in distributed computing environments, where tasks are performed by remote processing devices that are linked through a communications network. In a distributed computing environment, program modules may be located in both local and remote memory storage devices.

A network set up by an entity, such as a company or a public sector organization, to provide one or more services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment, and the like, needed to implement and distribute the infrastructure and services offered by the provider network. The resources may in some embodiments be offered to clients in units called instances, such as virtual or physical computing instances or storage instances. A virtual computing instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor).

A number of different types of computing devices may be used singly or in combination to implement the resources of the provider network in different embodiments, including general-purpose or special-purpose computer servers, storage devices, network devices, and the like. In some embodiments a client or user may be provided direct access to a resource instance, e.g., by giving a user an administrator login and password. In other embodiments, the provider network operator may allow clients to specify execution requirements for specified client applications and schedule execution of the applications on behalf of the client on execution platforms (such as application server instances, Java™ virtual machines (JVMs), general-purpose or special-purpose operating systems, platforms that support various interpreted or compiled programming languages—such as Ruby, Perl, Python, C, C++, and the like—or high-performance computing platforms) suitable for the applications. This may be done without, for example, requiring the client to access an instance or an execution platform directly. A given execution platform may utilize one or more resource instances in some implementations; in other implementations, multiple execution platforms may be mapped to a single resource instance.

Figure 9:
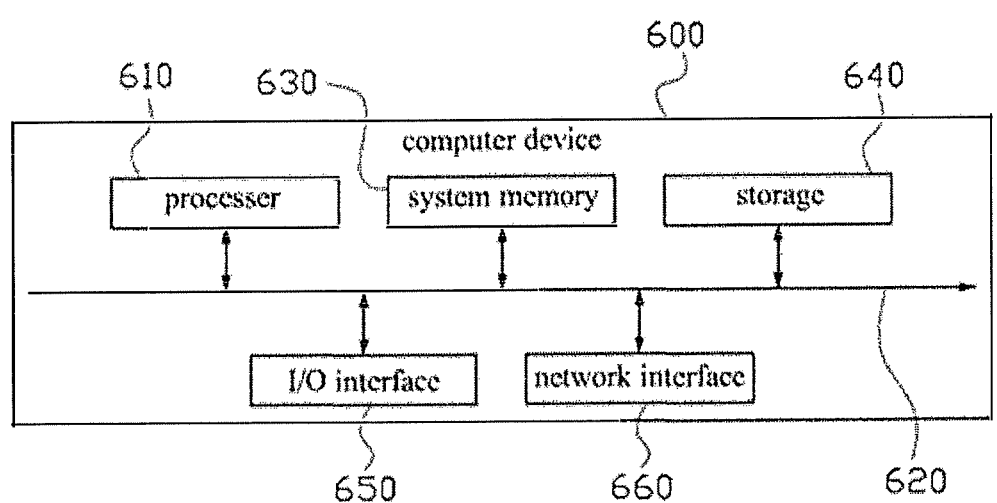
FIG. 9 is a schematic diagram illustrating an example computing device that may be used in accordance with the present disclosure.

In at least some embodiments, a server or computing device that implements a portion or all of one or more of the technologies described herein may include a general-purpose computer system that includes or is configured to access one or more computer-accessible media. FIG. 9 illustrates such a general-purpose computing device 600. In the illustrated embodiment, computing device 600 includes one or more processors 610 (which may be referred herein singularly as "a processor 610" or in the plural as "the processors 610") are coupled through a bus 620 to a system memory 630. Computing device 600 further includes a permanent storage 640, an input/output (I/O) interface 650, and a network interface 660.

In various embodiments, the computing device 600 may be a uniprocessor system including one processor 610 or a multiprocessor system including several processors 610 (e.g., two, four, eight, or another suitable number). Processors 610 may be any suitable processors capable of executing instructions. For example, in various embodiments, processors 610 may be general-purpose or embedded processors implementing any of a variety of instruction set architectures (ISAs), such as the x86, PowerPC, SPARC, or MIPS ISAs, or any other suitable ISA. In multiprocessor systems, each of processors 610 may commonly, but not necessarily, implement the same ISA.

System memory 630 may be configured to store instructions and data accessible by processor(s) 610. In various embodiments, system memory 630 may be implemented using any suitable memory technology, such as static random access memory (SRAM), synchronous dynamic RAM (SDRAM), nonvolatile/Flash-type memory, or any other type of memory.

In one embodiment, I/O interface 650 may be configured to coordinate I/O traffic between processor 610, system memory 630, and any peripheral devices in the device, including network interface 660 or other peripheral interfaces. In some embodiments, I/O interface 650 may perform any necessary protocol, timing, or other data transformations to convert data signals from one component (e.g., system memory 630) into a format suitable for use by another component (e.g., processor 610). In some embodiments, I/O interface 650 may include support for devices attached through various types of peripheral buses, such as a variant of the Peripheral Component Interconnect (PCI) bus standard or the Universal Serial Bus (USB) standard, for example. In some embodiments, the function of I/O interface 650 may be split into two or more separate components, such as a north bridge and a south bridge, for example. Also, in some embodiments some or all of the functionality of I/O interface 650, such as an interface to system memory 630, may be incorporated directly into processor 610.

Network interface 660 may be configured to allow data to be exchanged between computing device 600 and other device or devices attached to a network or network(s). In various embodiments, network interface 660 may support communication via any suitable wired or wireless general data networks, such as types of Ethernet networks, for example. Additionally, network interface 660 may support communication via telecommunications/telephony networks such as analog voice networks or digital fiber communications networks, via storage area networks such as Fibre Channel SANs or via any other suitable type of network and/or protocol.

In some embodiments, system memory 630 may be one embodiment of a computer-accessible medium configured to store program instructions and data as described above for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media, such as magnetic or optical media, e.g., disk or DVD/CD coupled to computing device 600 via I/O interface 650. A non-transitory computer-accessible storage medium may also include any volatile or non-volatile media, such as RAM (e.g. SDRAM, DDR SDRAM, RDRAM, SRAM, etc.), ROM, etc., that may be included in some embodiments of computing device 600 as system memory 630 or another type of memory.

Further, a computer-accessible medium may include transmission media or signals such as electrical, electromagnetic or digital signals, conveyed via a communication medium such as a network and/or a wireless link, such as may be implemented via network interface 660. Portions or all of multiple computing devices may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device," as used herein, refers to at least all these types of devices and is not limited to these types of devices.

Each of the processes, methods, and algorithms described in the preceding sections may be embodied in, and fully or partially automated by, code modules executed by one or more computers or computer processors. The code modules may be stored on any type of non-transitory computer-readable medium or computer storage device, such as hard drives, solid state memory, optical disc, and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel or in some other manner. Blocks or states may be added to or removed from the disclosed example embodiments. The example systems and components described herein may be configured differently than described. For example, elements may be added to, removed from, or rearranged compared to the disclosed example embodiments.

It will also be appreciated that some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network, or a portable media article to be read by an appropriate drive or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without author input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A method of fast displaying a video frame, comprising:
   starting a software decoding thread;
   initializing a software decoder by the software decoding thread;
   decoding and rendering a first group of images (GOP) of a video by the software decoder;
   starting a hardware decoding thread by the software decoding thread while decoding and rendering a first image of the GOP by the software decoder;
   initializing a hardware decoder by the hardware decoding thread while decoding and rendering at least one of other images of the GOP by the software decoder;
   sending data associated with the GOP to the hardware decoder;
   decoding the GOP by the hardware decoder, wherein the hardware decoder decodes the GOP but does not render the GOP;
   pausing the hardware decoding thread when the decoding the GOP by the hardware decoder is completed, wherein the hardware decoding thread is paused until the decoding and rendering the GOP by the software decoder is completed; and
   ending the software decoding thread when the decoding and rendering the GOP by the software decoder is completed.

2. The method of claim 1, further comprising:
   decoding and rendering images of the video subsequent to the GOP by the hardware decoder.

3. The method of claim 1, further comprising:
   creating a format description of VideoFormatDescription by the hardware decoding thread; and creating a session of VTDecompressionSession by the hardware decoding thread.

4. A system of fast displaying a video frame, comprising:
at least one processor; and
at least one memory communicatively coupled to the at least one processor and storing instructions that upon execution by the at least one processor cause the system to:
start a software decoding thread;
initialize a software decoder by the software decoding thread;
decode and render a first group of images (GOP) of a video by the software decoder;
start a hardware decoding thread by the software decoding thread while decoding and rendering a first image of the GOP by the software decoder;
initialize a hardware decoder by the hardware decoding thread while decoding and rendering at least one of other images of the GOP by the software decoder;
send data associated with the GOP to the hardware decoder;
decode the GOP by the hardware decoder, wherein the hardware decoder decodes the GOP but does not render the GOP;
pause the hardware decoding thread when the decoding the GOP by the hardware decoder is completed, wherein the hardware decoding thread is paused until the decoding and rendering the GOP by the software decoder is completed; and
end the software decoding thread when the decoding and rendering the GOP by the software decoder is completed.

5. The system of claim 4, the at least one memory further storing instructions that upon execution by the at least one processor cause the system to:
decode and render images of the video subsequent to the GOP by the hardware decoder.

6. The system of claim 4, the at least one memory further storing instructions that upon execution by the at least one processor cause the system to:
create a format description of VideoFormatDescription by the hardware decoding thread; and
create a session of VTDecompressionSession by the hardware decoding thread.

7. A non-transitory computer-readable storage medium bearing computer-readable instructions that upon execution on a computing device cause the computing device at least to:
start a software decoding thread;
initialize a software decoder by the software decoding thread;
decode and render a first group of images (GOP) of a video by the software decoder;
start a hardware decoding thread by the software decoding thread while decoding and rendering a first image of the GOP by the software decoder;
initialize a hardware decoder by the hardware decoding thread while decoding and rendering at least one of other images of the GOP by the software decoder;
send data associated with the GOP to the hardware decoder;
decode the GOP by the hardware decoder, wherein the hardware decoder decodes the GOP but does not render the GOP;
pause the hardware decoding thread when the decoding the GOP by the hardware decoder is completed, wherein the hardware decoding thread is paused until the decoding and rendering the GOP by the software decoder is completed; and
end the software decoding thread when the decoding and rendering the GOP by the software decoder is completed.

8. The non-transitory computer-readable storage medium of claim 7, further comprising computer-readable instructions that upon execution on the computing device cause the computing device at least to:
decode and render images of the video subsequent to the GOP by the hardware decoder.

9. The non-transitory computer-readable storage medium of claim 7, further comprising computer-readable instructions that upon execution on the computing device cause the computing device at least to:
create a format description of VideoFormatDescription by the hardware decoding thread;
and create a session of VTDecompressionSession by the hardware decoding thread.

* * * * *